US012595994B2

(12) United States Patent \
Rizvi

(10) Patent No.: US 12,595,994 B2 \
(45) Date of Patent: Apr. 7, 2026

(54) SPOOLED MARKING APPARATUS AND METHODS THEREFOR

(71) Applicant: Shamak LLC, Lewes, DE (US)

(72) Inventor: Farhad Qamar Rizvi, Frisco, TX (US)

(73) Assignee: Shamack LLC, Lewes, DE (US)

( * ) Notice: Subject to any disclaimer, the term of this patent is extended or adjusted under 35 U.S.C. 154(b) by 0 days.

(21) Appl. No.: 19/000,619

(22) Filed: Dec. 23, 2024

(65) Prior Publication Data

US 2025/0130031 A1 Apr. 24, 2025

Related U.S. Application Data

(63) Continuation-in-part of application No. 18/331,171, filed on Jun. 8, 2023, which is a continuation of application No. 17/336,300, filed on Jun. 1, 2021, now Pat. No. 11,692,802.

(60) Provisional application No. 63/093,793, filed on Oct. 20, 2020.

(51) Int. Cl.
| | |
|---|---|
| *G01B 3/1048* | (2020.01) |
| *G01B 3/1007* | (2020.01) |
| *G01B 3/1043* | (2020.01) |
| *G01B 3/1071* | (2020.01) |
| *G01B 3/1089* | (2020.01) |

(52) U.S. Cl.
CPC ......... *G01B 3/1048* (2020.01); *G01B 3/1007* (2020.01); *G01B 3/1043* (2020.01); *G01B 3/1071* (2013.01); *G01B 3/1089* (2020.01); *G01B 2003/1074* (2013.01)

(58) Field of Classification Search
CPC .. G01B 3/1048; G01B 3/1007; G01B 3/1043; G01B 3/1071; G01B 3/1089; G01B 2003/1074
See application file for complete search history.

(56) References Cited

U.S. PATENT DOCUMENTS

| | | | | |
|---|---|---|---|---|
| 3,668,781 | A | * | 6/1972 | Teter ...................... A63C 19/08 |
| | | | | 33/1 H |
| 4,160,324 | A | | 7/1979 | Dunn |
| 5,010,656 | A | * | 4/1991 | Broselow ............. A61B 5/1072 |
| | | | | 33/759 |
| 5,042,613 | A | * | 8/1991 | Hermann ................. A62B 3/00 |
| | | | | 33/759 |
| 5,107,595 | A | | 4/1992 | Stay |
| 5,253,421 | A | | 10/1993 | Landmark |
| 5,371,949 | A | | 12/1994 | Delaurier |
| 5,427,383 | A | | 6/1995 | Viens |

(Continued)

FOREIGN PATENT DOCUMENTS

JP 3194517 U 11/2014

*Primary Examiner* — Yaritza Guadalupe-McCall \
(74) *Attorney, Agent, or Firm* — Lloyd & Mousilli; Feras Mousilli; Benjamin M. Hanrahan

(57) ABSTRACT

A spooled marking apparatus for defining layouts of athletic fields, playing surfaces, home improvement projects, and the like is presented herein. The reel includes a housing within which a spool is disposed retaining an elongated marking device wound thereon. The housing includes an opening through which a free end of the elongated marking device is allowed to pass through. The free end of the elongated marking device includes a fastener, and the housing includes a lock and a roller handle.

18 Claims, 19 Drawing Sheets

(56)  References Cited

U.S. PATENT DOCUMENTS

| | | | | |
|---|---|---|---|---|
| 5,884,408 | A * | 3/1999 | Simmons | G01B 3/004 |
| | | | | 33/761 |
| 5,928,095 | A * | 7/1999 | Aldstadt | A63C 19/065 |
| | | | | 33/759 |
| 6,276,069 | B1 * | 8/2001 | Chadwick | A41H 1/02 |
| | | | | 235/78 R |
| 6,430,819 | B1 * | 8/2002 | Aldstadt | A63C 19/06 |
| | | | | 33/1 G |
| 6,893,365 | B2 | 5/2005 | Rathbun et al. | |
| 6,951,061 | B1 | 10/2005 | Rosetti | |
| 6,990,741 | B1 | 1/2006 | Wells | |
| 7,062,859 | B1 | 6/2006 | Revnell | |
| 7,162,805 | B2 * | 1/2007 | Vick | B43L 13/02 |
| | | | | 33/483 |
| 7,870,679 | B2 | 1/2011 | Lee et al. | |
| 7,984,562 | B2 | 7/2011 | Redmond | |
| 8,789,286 | B1 * | 7/2014 | Vieczorek, Jr. | G01B 3/1003 |
| | | | | 33/760 |
| 8,966,774 | B2 | 3/2015 | Choi et al. | |
| 10,926,576 | B2 * | 2/2021 | Franco | B43L 13/00 |
| 10,981,042 | B2 * | 4/2021 | Parker | A63B 1/00 |
| 11,029,136 | B2 | 6/2021 | Richey | |
| 11,692,802 | B2 * | 7/2023 | Rizvi | G01B 3/1007 |
| | | | | 33/770 |
| 11,719,538 | B2 * | 8/2023 | Tecu | A63C 19/065 |
| | | | | 33/293 |
| 11,859,968 | B2 * | 1/2024 | Tecu | G01B 3/1069 |
| 2005/0011082 | A1 * | 1/2005 | Smith | A63B 57/357 |
| | | | | 33/758 |
| 2006/0010705 | A1 * | 1/2006 | Dettellis | G01B 3/11 |
| | | | | 33/756 |
| 2007/0240319 | A1 | 10/2007 | Long | |
| 2008/0022545 | A1 * | 1/2008 | Wirtz | G01B 3/10 |
| | | | | 33/759 |
| 2010/0180459 | A1 * | 7/2010 | Redmond | G01B 5/0023 |
| | | | | 33/562 |
| 2011/0232119 | A1 * | 9/2011 | Smalls | G01B 3/1041 |
| | | | | 33/771 |
| 2013/0185949 | A1 | 7/2013 | Burch | |
| 2015/0107128 | A1 | 4/2015 | Samuel | |
| 2022/0390220 | A1 * | 12/2022 | Tecu | G01D 7/12 |
| 2023/0107900 | A1 * | 4/2023 | Tecu | G01C 15/06 |
| | | | | 33/293 |
| 2023/0314115 | A1 * | 10/2023 | Rizvi | G01B 3/1089 |
| | | | | 33/770 |

* cited by examiner

24

30

<u>200</u> provide multiple spooled marking apparatuses — 202 dispose a predetermined number of marking apparatuses at predefined positions, each of the marking apparatuses define a point in the layout (e.g., a corner of the perimeter) — 204

Connect the marking apparatuses together — 206

Continue to connect each marking apparatus to form the desired layout or perimeter — 208

SPOOLED MARKING APPARATUS AND METHODS THEREFOR

CLAIM OF PRIORITY/CROSS REFERENCE TO RELATED APPLICATIONS

The present application is a Continuation-In-Part Patent Application of U.S. patent application Ser. No. 18/331,171 filed on Jun. 8, 2023, which is a Continuation Patent Application of U.S. patent application Ser. No. 17/336,300 filed on Jun. 1, 2021, which claims the benefit of U.S. Provisional Patent Application No. 63/093,793 filed on Oct. 20, 2020.

The contents of all above-referenced prior patent applications, namely, U.S. patent application Ser. No. 18/331,171 filed on Jun. 8, 2023, U.S. patent application Ser. No. 17/336,300 filed on Jun. 1, 2021, and U.S. Provisional Patent Application No. 63/093,793 filed on Oct. 20, 2020, are incorporated herein in their entirety by reference.

FIELD OF THE INVENTION

The present invention relates generally to a spooled marking apparatus useful to define a perimeter or layout of an athletic field and other playing surface or sporting event, as well as other applications including but not limited to home improvement, construction, remodeling, etc.

BACKGROUND OF THE INVENTION

Many sports involve a designated area where the primary action takes place, typically marked by clearly defined boundaries. These boundaries not only separate the active playing field from the surrounding areas but also serve to distinguish players from non-playing personnel, such as coaches, medical staff, and bench players, who remain close by as integral parts of the sport. Additionally, these marked perimeters play a crucial role in determining the outcomes of specific events across various sports. For example, in basketball and soccer, the ball must remain within the boundaries of the court or field. If the ball crosses these boundaries, possession is awarded to the opposing team that was not the last to touch it. In sports like tennis and volleyball, the server is required to strike the ball from behind the back boundary. Additionally, in sports such as badminton, tennis, and volleyball, points are scored based on whether the ball lands inside or outside the boundary lines and which team last touched the ball.

Most sporting activities are often undertaken by small groups of people, usually friends or acquaintances, in locations not specifically designed for those sports. For example, a group of six friends might gather at a beach where one brings a volleyball, net, and poles to set up a makeshift court, with boundaries drawn in the sand. However, these lines frequently get erased during play. Similarly, a smaller group might play soccer in a park where proper field boundaries are not available, or during practice sessions, coaches might divide a soccer team into smaller groups to practice in different sections of the field. In these informal settings, boundaries are often marked using visual cues, such as a tree or bush, which can make it difficult to determine whether the ball was in or out. This lack of clear boundaries can lead to disputes among players, creating tension over whether a play was valid.

Additionally, traditional methods of marking boundaries rely on rough estimations of dimensions, often leading to inaccuracies, as players typically do not have access to measurement tools that ensure precise boundary placement.

Plastic sports cones are also commonly used to define boundaries, but they are often misaligned and not set up in straight lines. During active play, they are frequently stepped on or moved, further disrupting their placement. Like other makeshift boundary markers, cones fail to provide accurate dimensions to the playing field, adding to the inconsistency of the play area.

Some sports kits come with built-in boundary systems, but these are typically designed for specific sports and are not adaptable for fewer players or other sports. For instance, a soccer kit might include equipment for setting up a soccer field perimeter, but it cannot be used to create a volleyball or basketball court. Additionally, the dimensions are often fixed for a standard number of players, making it difficult to adjust for different group sizes. While these setups are beneficial for professional teams, they are impractical for recreational players, as they would need to purchase multiple kits for different sports, which can be costly. Moreover, storing these setups can be problematic, as they require a significant amount of space.

Setting up boundaries is not only useful in sporting activities but also in other areas, such as construction. For example, when planning the layout of a construction site, it is often necessary to demarcate specific regions, like the future location of a pool or a kitchen island in a house. These areas typically have unique and precise dimensions that must be accurately marked to ensure proper placement and alignment during the building process.

Currently, no tool exists in the home improvement, tools, or sports equipment market that allows users to place a marker on the ground that dispenses measuring tape while remaining stationary and can connect to other points to measure an area. Additionally, there is no measuring tool that enables measurements in multiple directions from a single point without moving its base.

SUMMARY OF THE INVENTION

In at least one embodiment, a spooled marking apparatus is provided, the spooled marking apparatus including a base, a band or tape reel, and in some cases, a means of connecting the base and the spooled marking apparatus. The band or tape reel includes a spool of a tape or elongated marking device which is wound on the spool while the free end is allowed to extend outward towards an opening in the housing.

In some embodiments, the tape or elongated marking device or material includes a color-coded marking system that encapsulates the different standardized lengths of a plurality of playing fields. For example, different color or other markings on the same tape can represent different standardized or traditional lengths commonly used to demarcate various playing surfaces. For example, the distance between the pitcher and home plate for collegiate baseball can be marked with one color while he distance between the bases and/or the distances used for volleyball courts may be marked with another color.

Furthermore, in at least one embodiment, a positioning assembly comprising a plurality of spaced holes or openings formed along the length of the band and a plurality of corresponding clips, clamps, stakes, pins, etc. can be used to position the band or tape into various angled orientations. This can be useful for several different applications, including but in no way limited to marking off routes for wide receivers in the sport of American football.

Additionally, in at least one embodiment, the spooled marking apparatus includes a digital display that outputs the measurements for the user to see, a speaker for audible alerts and communications to the user, and a laser measurement system that assists the user in acquiring necessary data for accurate placements.

BRIEF DESCRIPTION OF DRAWINGS

These and other features, aspects, and advantages of the embodiments will become better understood when the following detailed description is read with reference to the accompanying drawings in which like characters represent like parts throughout the drawings, wherein.

DETAILED DESCRIPTION OF THE INVENTION

The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the term "or" is generally employed in its sense including "and/or" unless the content clearly dictates otherwise.

Figure 1A:
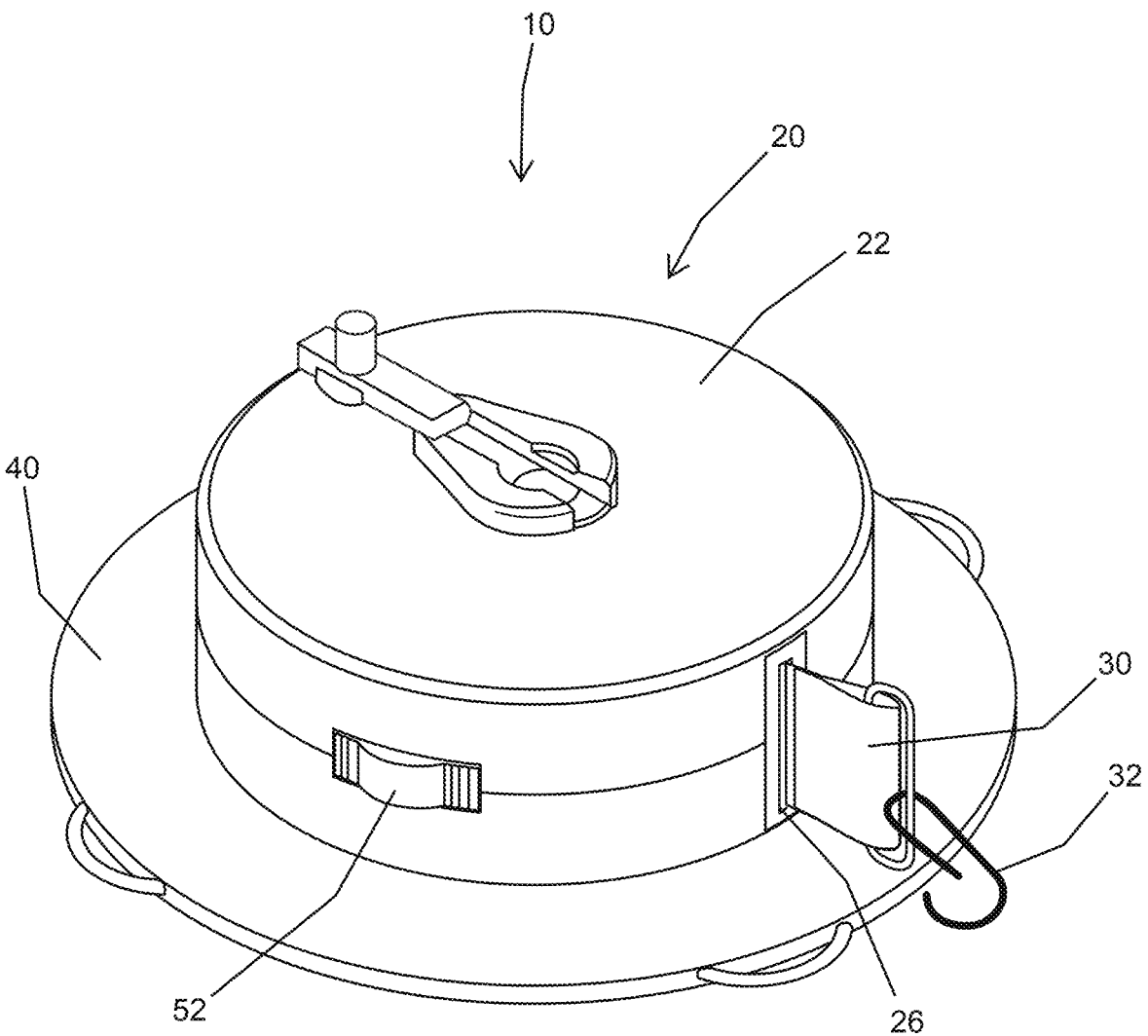
FIG. 1A is a perspective view of a spooled marking apparatus as disclosed in accordance with at least one embodiment of the present invention with the marking device substantially retracted into the housing.
Figure 1B:
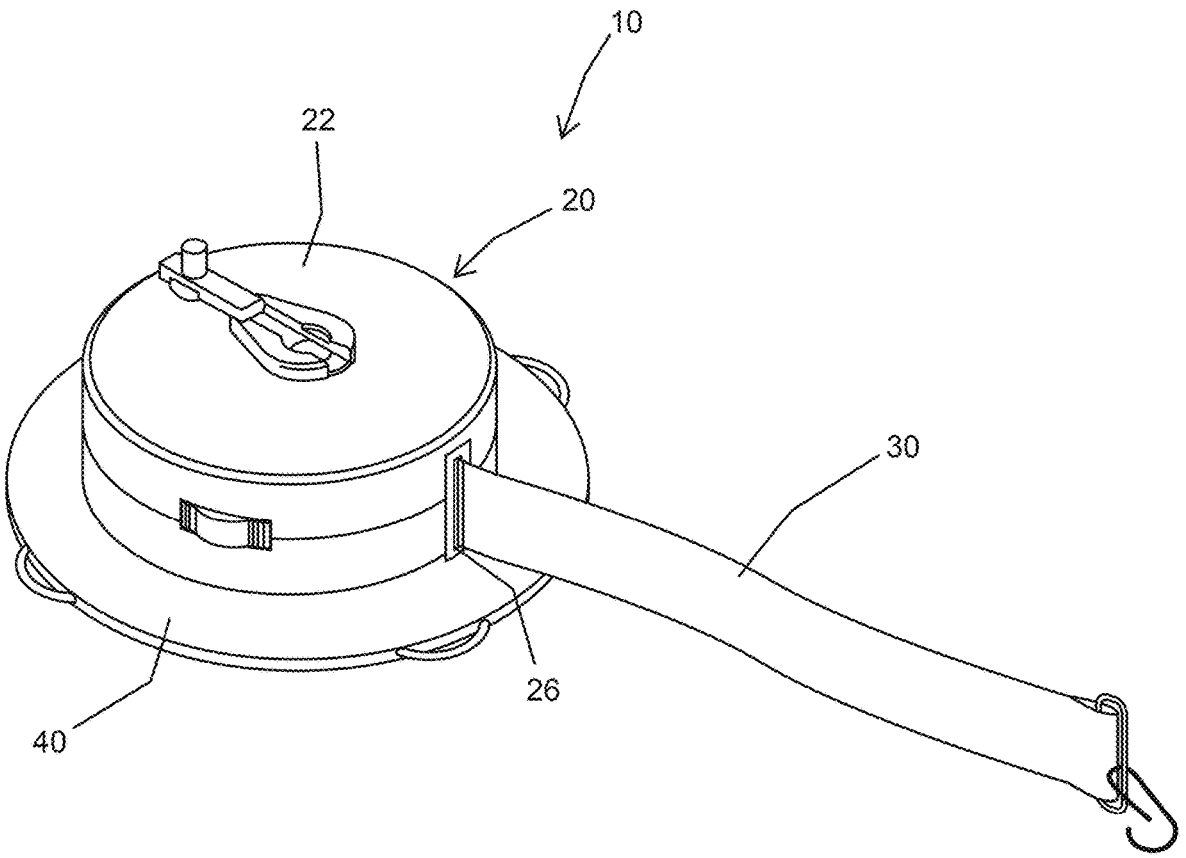
FIG. 1B is another perspective view of the spooled marking apparatus of FIG. 1A with the marking device at least partially extracted from the housing.

As shown in the accompany drawings, and with particular reference to FIGS. 1A and 1B, at least one embodiment of the present invention is directed to a tape dispenser or in some cases, referred to as a spooled marking apparatus, generally referenced as 10. In particular, the tape dispenser and/or marking apparatus 10 includes a reel 20, which includes a housing 22 that retains a spool or an amount of the tape or elongated marking device 30, as described in greater detail below.

In some cases, the apparatus 10 of at least one embodiment also includes a base, generally referenced as 40, which helps support the reel 20 on a surface, such as the ground, grass, turf, concrete, court, etc. In some embodiments, the base 40 may be defined as a gripper pad that includes the ability to secure to the ground or surface, for example, through suction, spikes, pins, stakes, etc.

It should also be noted that while in some embodiments described herein the base 40 and reel 20 are separate structures connected to one another via a connector 100, in other embodiments, the base 40 and the reel 20 may be a single device or structure such that the reel 20 is not removable from the base 40. For example, the reel 20 and base 40 may, in those embodiments, be separately constructed but secured to one another such that they are not removable. In other cases, the base 40 and reel 20 may be a single unitary structure. Still in other embodiments, the reel 20 may be operated by itself, without the use of a base or gripper pad 40.

Figure 2A:
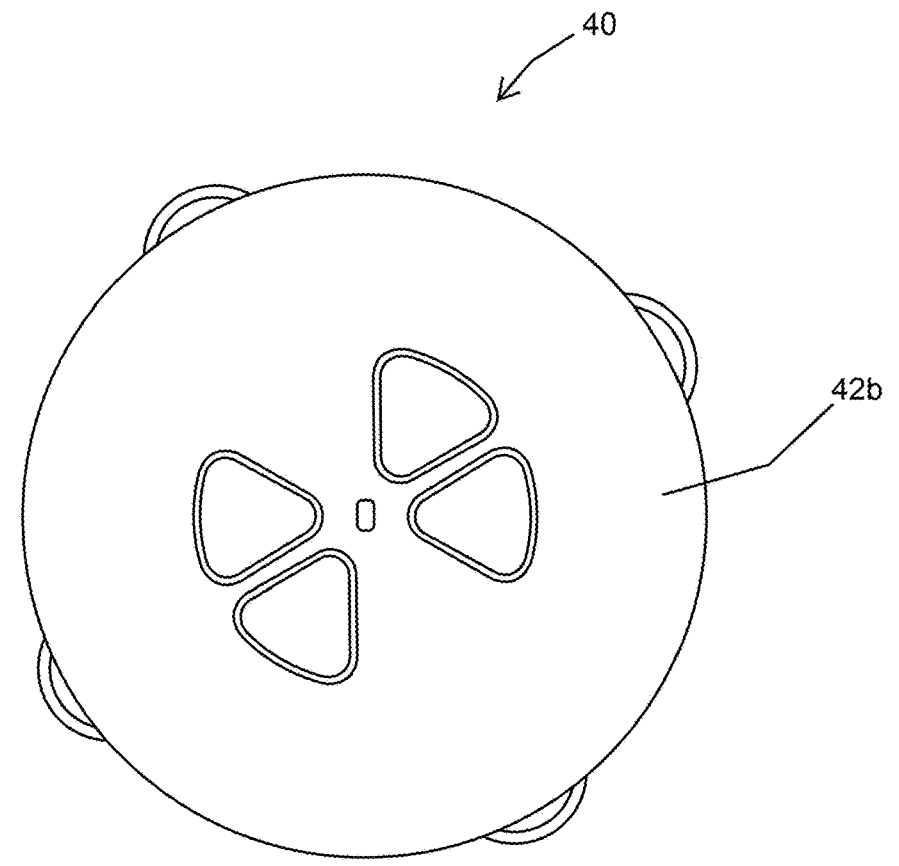
FIG. 2A is a top view of the base of the spooled marking apparatus as disclosed in accordance with at least one embodiment.
Figure 2B:
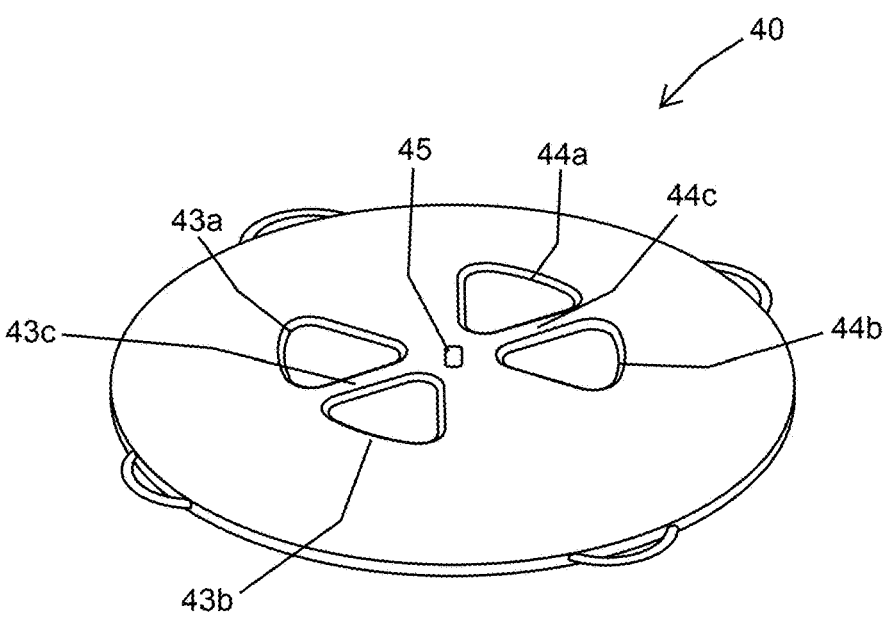
FIG. 2B is a bottom perspective view of the base of FIG. 2A.

FIGS. 2A and 2B illustrate an exemplary base or gripper pad 40 of at least one embodiment, which is defined by or otherwise includes a top surface 42*a* and a lower or bottom surface 42*b*. The lower or bottom surface 42*b* is configured to be placed on any surface, such as a floor, a lawn, and the like. In at least one embodiment, the lower or bottom surface 42*b* includes at least one means for suction grip. For example, in one embodiment, the base or gripper pad 40 is dome-shaped or otherwise includes a concave curvature on the bottom surface 42*b* to create a suction effect once weight is distributed on the top surface 42*a*, for example, via attachment of the reel 20.

In some embodiments, the top surface 42*a* of the base or gripping pad 40 includes a receptacle or hole 45 to which a connector 100 can engage, as described in accordance with at least one embodiment herein.

Still referring to FIGS. 2A and 2B, the base 40 of at least one embodiment may also include one or more holes 43*a-b*, 44*a-b* and/or support pieces 43*c*, 44*c* to receive and/or engage with a stake or spike (not shown). For example, in at least one embodiment, the base 40 includes at least one set of holes 43*a-b* and/or 44*a-b*, each of which define a support piece 43*c*, 44*c* there between. In this manner, a stake or pin can pass through the one or more holes 43*a-b* and/or 44*a-b* and bridge over or engage the corresponding support piece 43*c* or 44*c*. For instance, the stake or pin may, but need not be, U-shaped, such that the two arms or ends of the U-shaped stake (not shown) can pass through the holes 43*a-b* or 44*a-b* and be driven into the ground, while the connecting piece of the U-shaped stake will pass over and engage the corresponding support piece 43*c*, 44*c* of the base 40. In this manner, the stake will ensure that the base or gripper pad 40 will remain firmly affixed especially on uneven surfaces such as lawns and turfs.

Figure 3:
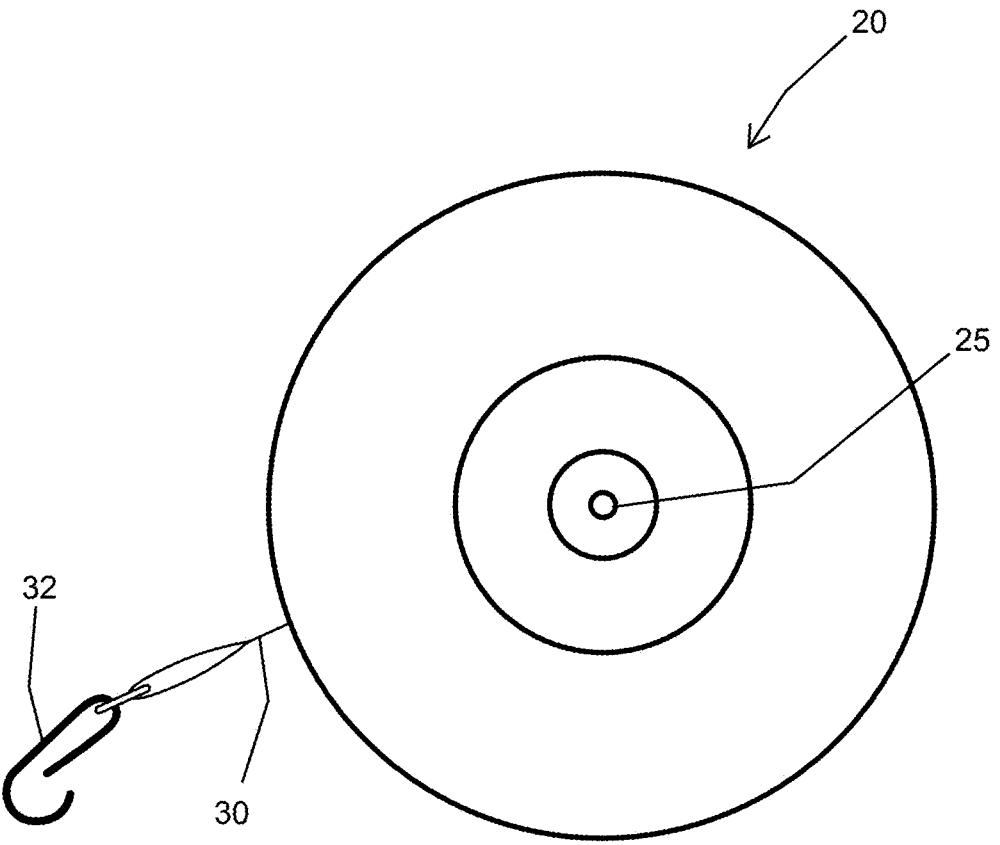
FIG. 3 is a bottom view of the reel of the spooled marking apparatus as disclosed in accordance with at least one embodiment of the present invention.
Figure 4:
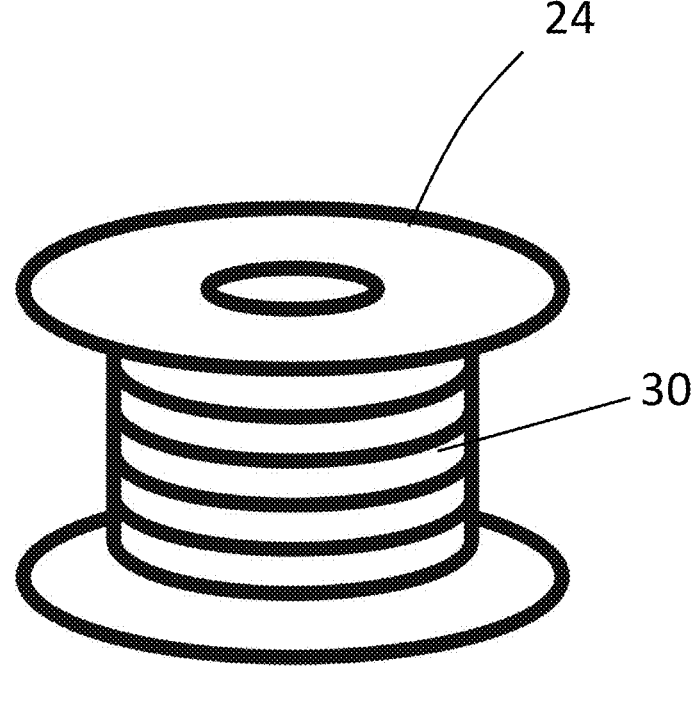
FIG. 4 is a spool useful in the spooled marking apparatus as disclosed in accordance with at least one embodiment of the present invention.

Furthermore, with reference to FIGS. 1A, 1B and 3, the reel 20 of at least one embodiment includes a housing 22. Enclosed within the housing 22 is a spool 24. An exemplary spool 24 is shown in FIG. 4 as lying on its side. Typically, spool is a cylinder that is fixed on both ends to the housing 22 but is allowed to spin freely around an axis of rotation. A tape or other elongated marking device 30 is wound onto or around the spool, thus rendering the tape and/or marking device 30 retractable, wherein one end of the tape or marking device 30 is fixed to the spool 24 while the other end is free. The spool 24 is configured to spin in one direction that will allow the tape or marking device 30 to be dispensed, while spinning in the opposite direction will allow the tape or marking device 30 to be retracted. Spool 24 may also include spring-loaded mechanisms to enable it to be spun in the direction that retracts the tape 30.

Returning to FIGS. 1A and 1B, the housing 22 includes an opening 26 through which the tape or elongated marking device 30 is dispensed from. In at least one embodiment, the free end of the tape 30 includes a fastener 32, such as a clip, clasp, hook, hook-and-loop fastener, snap, etc. The housing 22 also includes a receiving means (not shown) for the fastener 32. In at least one embodiment, the fasteners 32 may include hooks (as shown in the figure). Other exemplary fastening mechanisms may also be used, and are envisioned to be encompassed within the scope of the embodiments.

The tape or elongated marking device 30 of the various embodiments described herein can be made of any material useful for this purpose, and may include, for example, but not limited to, canvas, nylon, cotton, plastic backed fiber, and the like. The tape or elongated marking device 30 can also include measurement units printed on it, as well as color-coded markings as described herein, or other markings to enable setting up perimeters or distances with precise measurements. The units for measurement may include various systems of distance measurements, such as meters, centimeters, inches, feet, yards, and so on, and combinations thereof. In one embodiment, measurement units or other markings may be printed on both left and right hand side of the tape 30. Further, measurement units or other markings may be printed on the top and bottom sides of the tape 30. In this manner, different systems of measurements can be included that will allow for setting up perimeters with accurate measurements regardless of the measurement system in a simple, easy to read manner.

Additionally, the tape dispenser or marking apparatus 10 as described also allows for simple measurements between two points, wherein the first position is affixed without the requirement of a second person or any additional tools. In this manner, two positions can be marked using suitable means for a specific surface, such as a peg or a stake on a grass surface.

FIG. 3 is a view of the bottom of the tape reel 20, which includes a receptacle 25 for the connector 100 or other connecting means, as described herein.

Furthermore, the reel 20 of at least one embodiment also includes a lock 52 that will allow the spool to be locked in a certain position after the tape or marking device 30 has been extended to a desired length. Further, the reel 20 includes a folding hand crank 70 that enables retracting the tape 30 into the housing 22 of the reel 20.

Figure 5B:
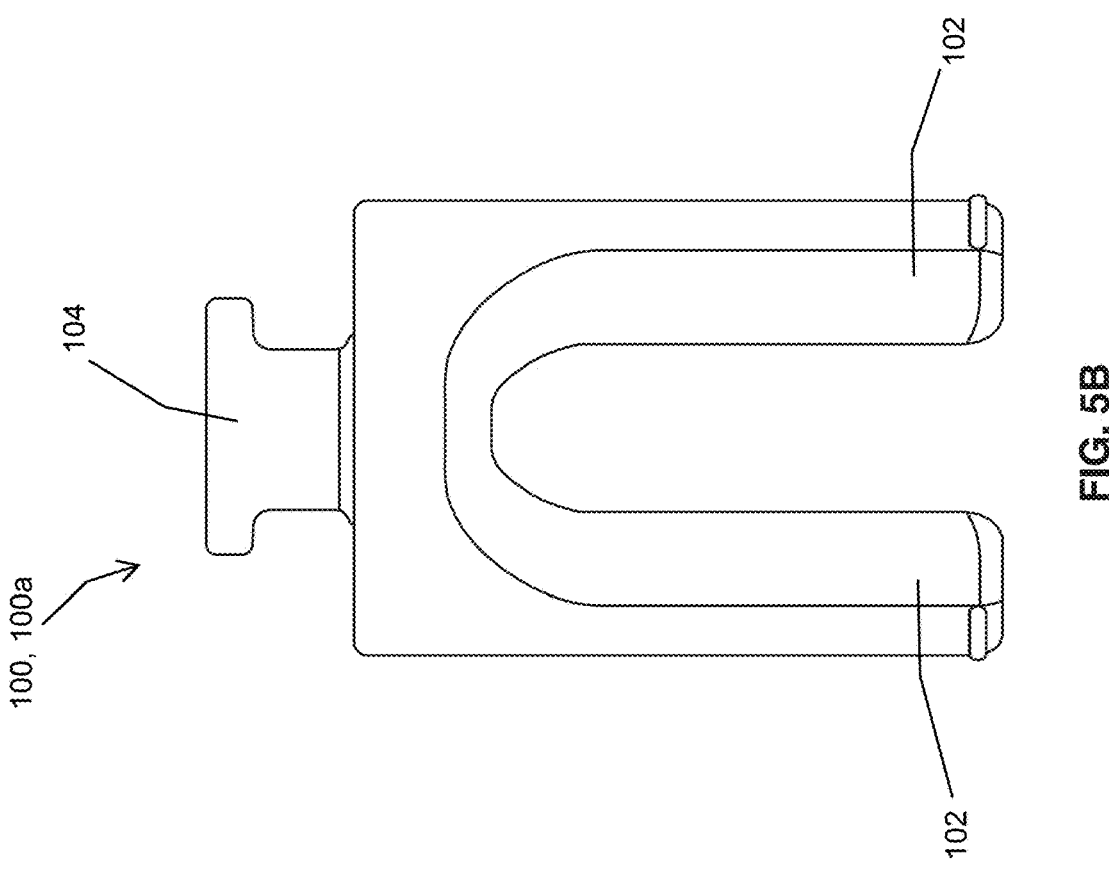
FIG. 5B is a side view of the wedge connector shown in FIG. 5A.
Figure 5A:
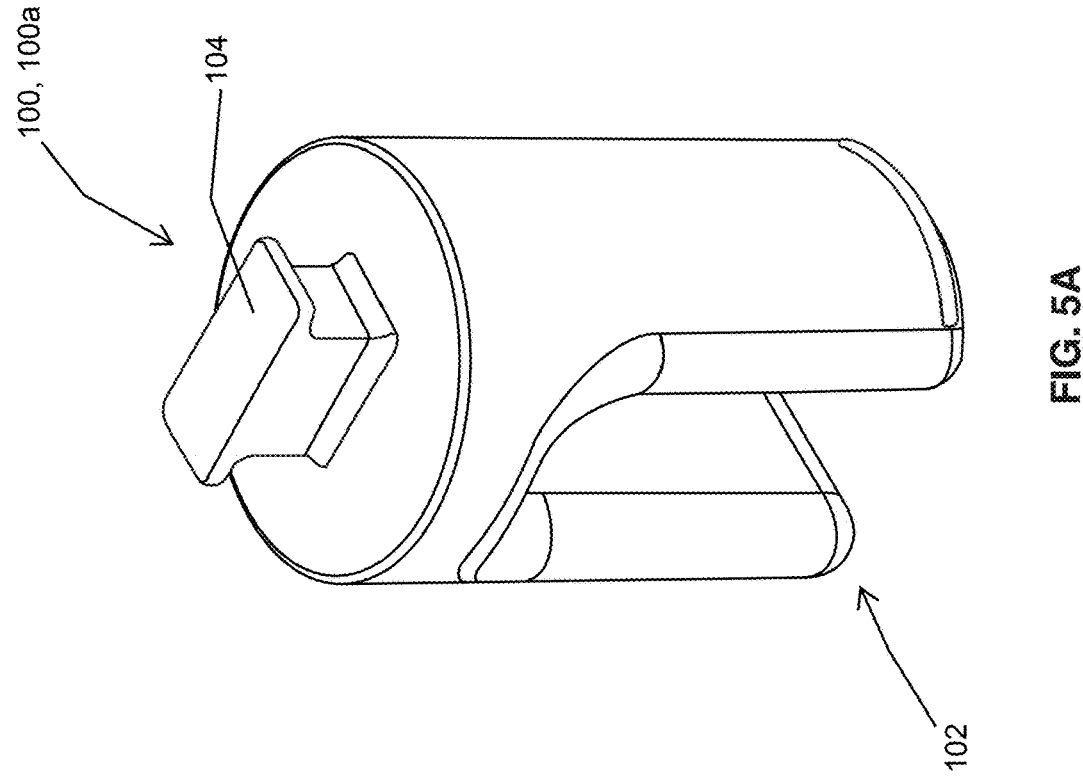
FIG. 5A is a perspective view of the wedge connector as disclosed in accordance with at least one embodiment of the present invention.

Moreover, in at least one embodiment, the tape dispenser or marking apparatus 10 includes a connector 100 or other connecting means. For example, FIGS. 5A and 5B illustrate one exemplary connector 100, referenced as a wedge connector 100*a*. The wedge connector 100*a* of at least one embodiment includes one or more connectors 102, such as but not limited to prongs that is/are capable of being received by the receptacle 25 on the bottom of the reel 20. In at least one embodiment, the receptacle 25 can be designed in such a way that the connector(s) 100 can be inserted in a certain direction only, and once inside, it can then be twisted or rotated thus ensuring it won't slip out. This creates a swivel effect that allows the ability to measure in different directions from a particular spot without moving the base.

Still referring to FIGS. 5A and 5B, the wedge connector 100*a* also includes a wedge or connector at the other end, as generally referenced as 104 that can be inserted into the receptacle 45 on the gripper pad 40. In this manner, the gripper pad 40 and the reel 20 are firmly connected to each other via the connector 100.

Figure 6A:
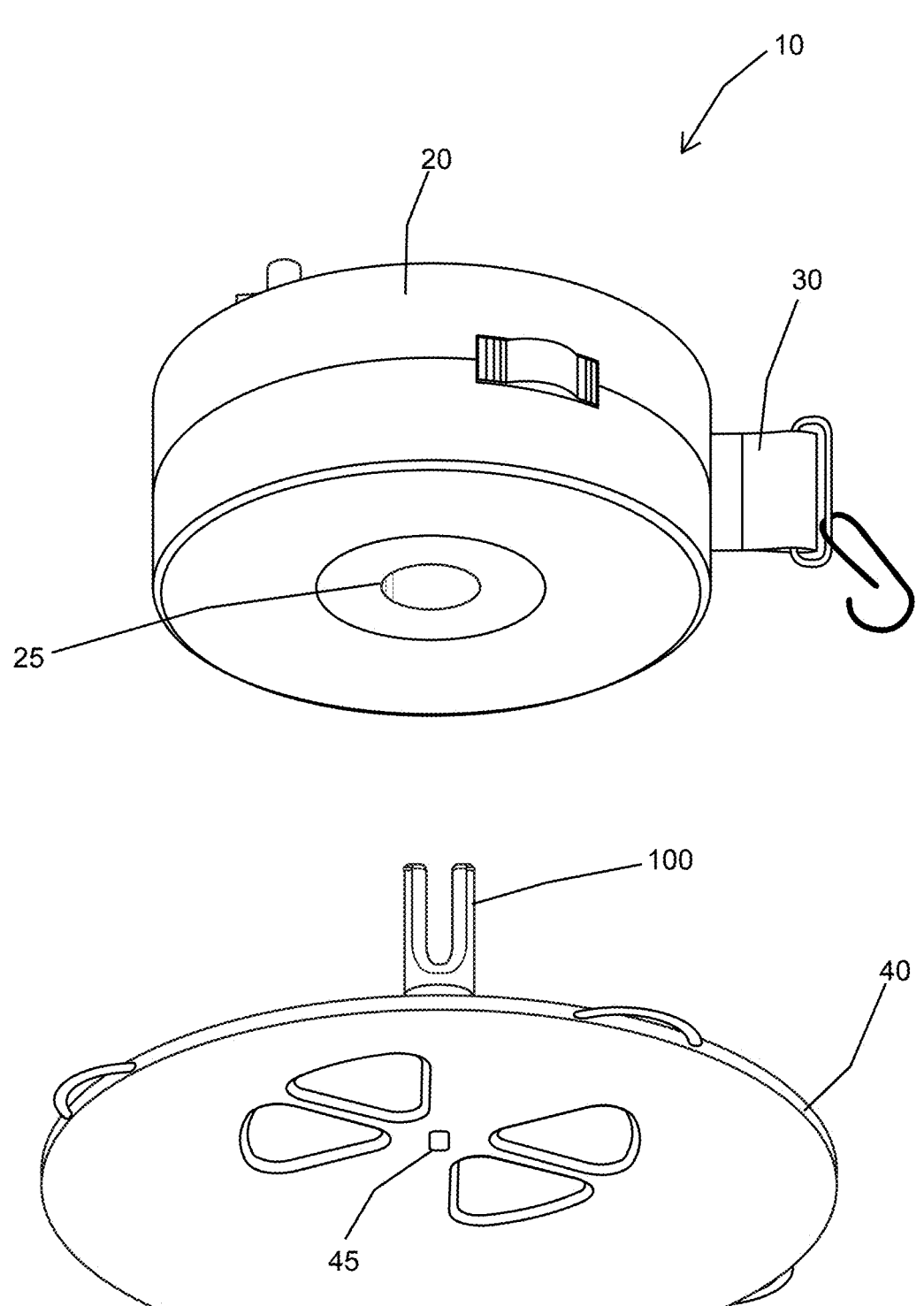
FIG. 6A is a perspective exploded view of the reel and base being connected to one another via a connector as disclosed in accordance with at least one embodiment of the present invention.
Figure 6B:
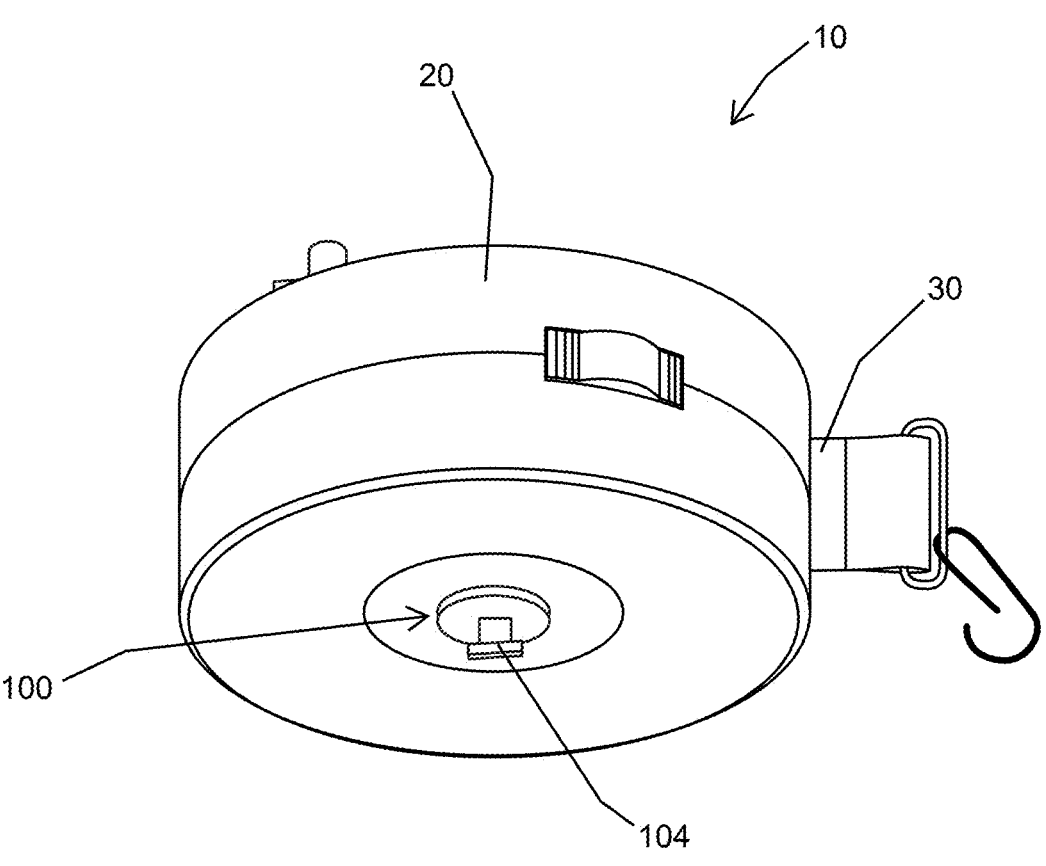
FIG. 6B is another perspective exploded view of the reel and base being connected to one another via a connector as disclosed in accordance with at least one embodiment of the present invention.
Figure 6B:
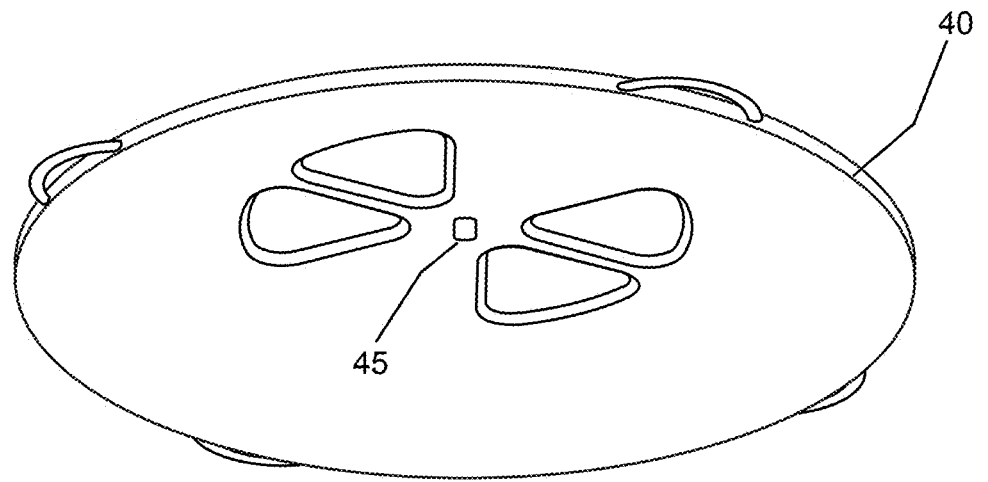
Figure 6C:
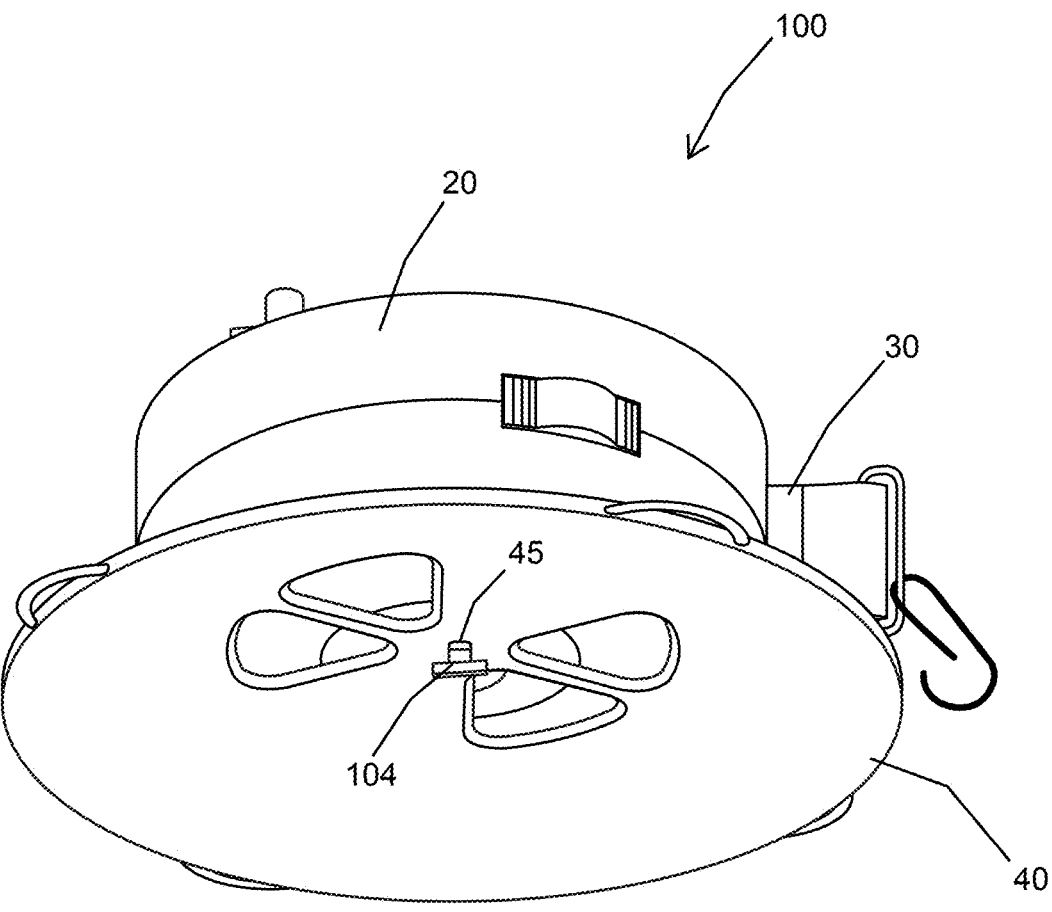
FIG. 6C is a perspective view of the reel and base connected to one another as disclosed in accordance with at least one embodiment of the present invention.

FIGS. 6A-6C illustrate how the wedge connector 100*a* of at least one embodiment is used to connect the reel 20 to the base or gripper pad 40.

Figure 7A:
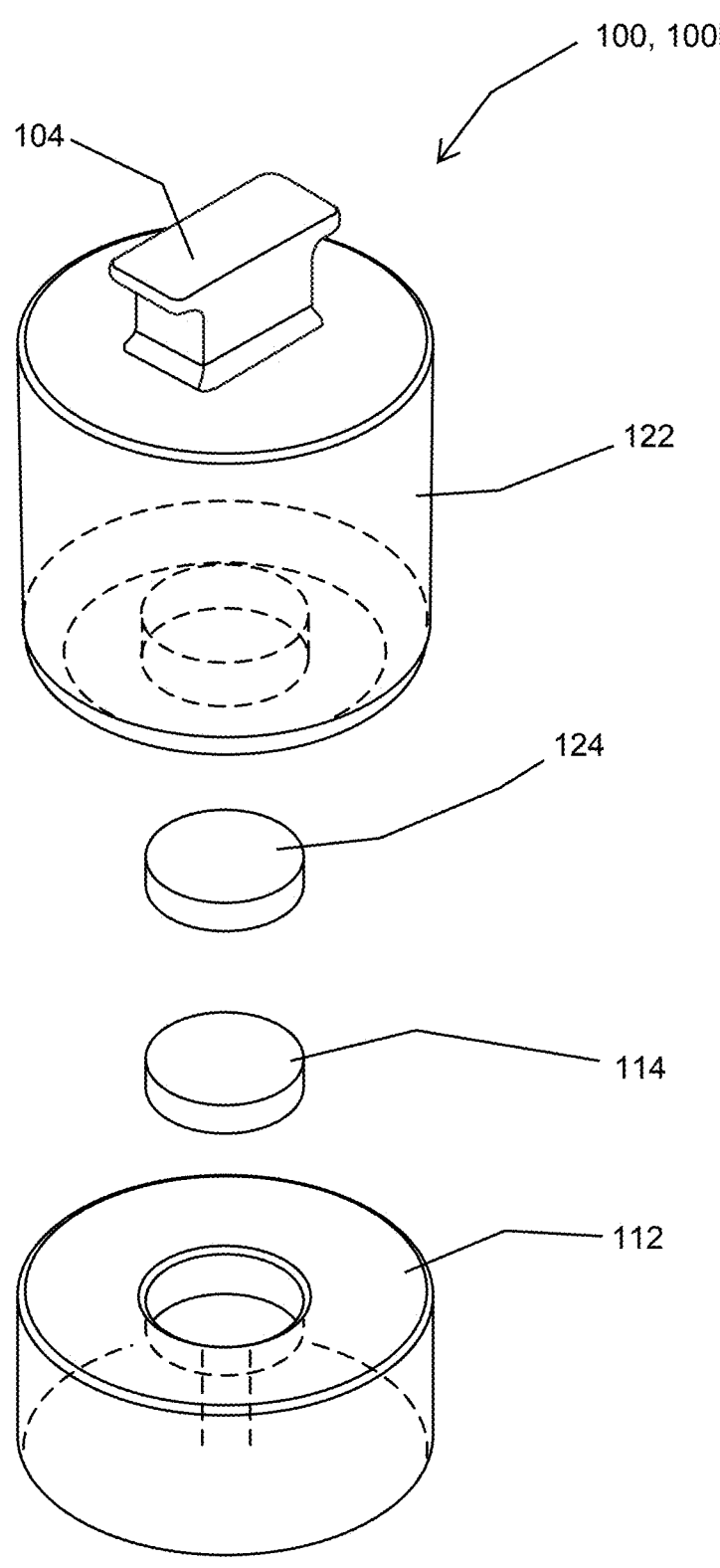
FIG. 7A is an exploded perspective view of a magnetic connector as disclosed in accordance with at least one embodiment of the present invention.
Figure 7B:
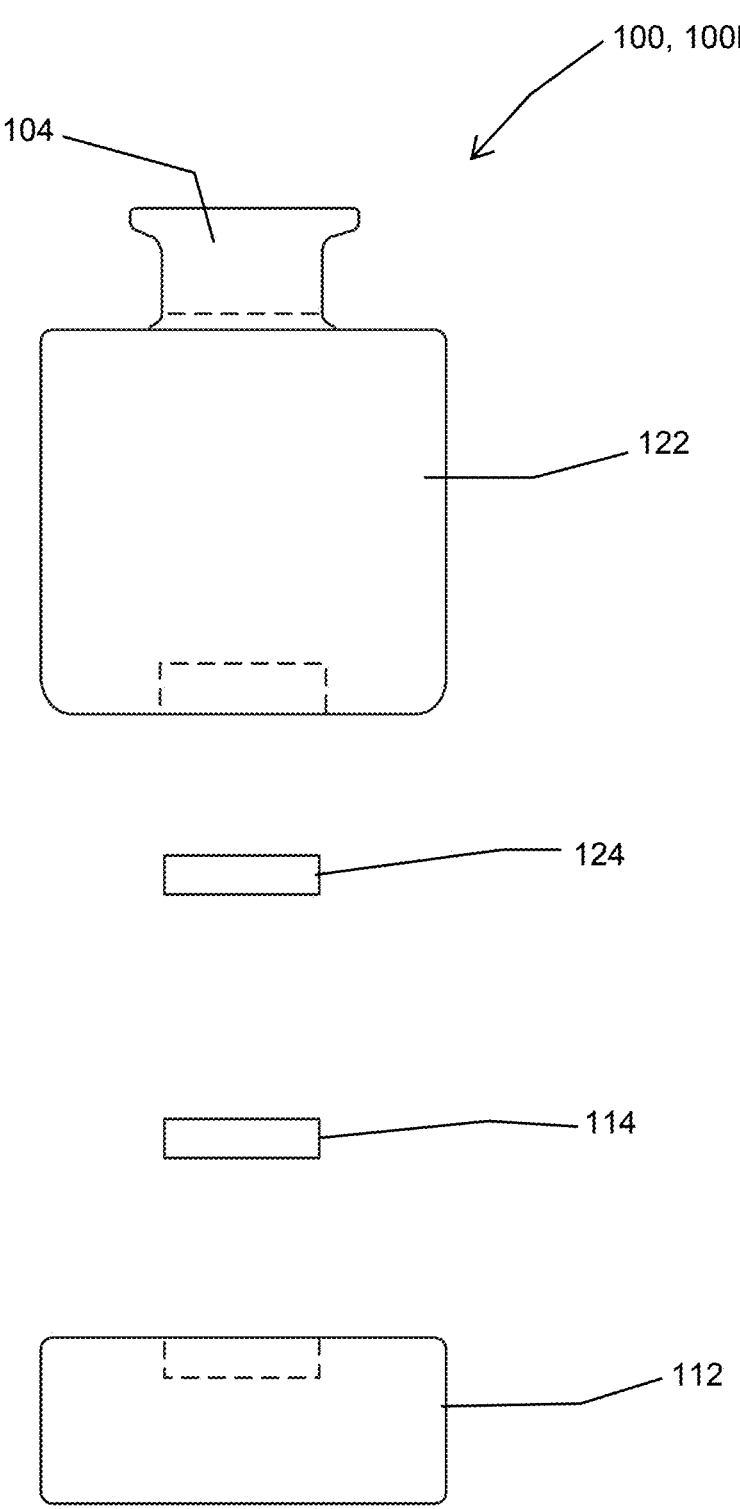
FIG. 7B is an exploded side view of the magnetic connector illustrated in FIG. 7A.

FIGS. 7A and 7B are exploded views of another connector 100, referenced as a magnetic connector 100*b*, according to an embodiment. The magnetic connector 100*b* of at least one embodiment includes a first base 112 with a receptacle for a magnet 44, and a second base 122 with a receptacle for a magnet 124, wherein the magnets 114, 124 have opposite polarities facing each other to enable strong attraction between them. Extending from base 122 is a connector 104 that corresponds with and connects to the base 40, for example, in receptacle 45. Base 112 is attached or connected to the reel 20, allowing the base 40 to be magnetically attached to the reel 20.

Other means of connecting and locking the connecting means may be envisioned to be encompassed within the scope of the embodiments. For example, other ways to connect the reel 20 to the base 40 include, but are not limited to, hook-and-loops type fasteners, snaps, magnetic connections, a pocket-like device on the top surface of the base 40 that can receive the reel 20 therein, etc.

Thus, the tape dispenser or spooled marking apparatus 10 of at least one embodiment is capable of being affixed on or supported by any surface from which the tape or elongated marking device 30 can be dispensed, and the tape or marking device 30 can be fastened onto a suitable fastening means on the other end. Once the gripper pad or base 40 is connected with the reel 20, the base 40 can be placed on any type of surface and it will not move once tape 30 is disbursed. Once the situation that required the tape dispenser 10 has been dispensed with (e.g., the conclusion of a sporting activity or completion of a construction project), the tape 30 can be retracted and the tape dispenser 10 can be stored away for future use without taking too much space.

The tape dispenser or marking apparatus 10 of at least one embodiment is also configured such that the reel 20 can freely rotate to allow the tape 30 to be extended in any direction without affecting the gripper pad 40 of the tape dispenser 10. One way of achieving proper fixation of the gripper pad 40 is by shaping it like a dome to create a suction effect once weight is distributed on top. Once the gripper pad 40 is connected with the reel 20, it can be placed on any type of surface and it will not move once tape is disbursed. The tape lock 52 can also be configured to lock the tape reel 20 to not spin anymore in its locked position, thus ensuring the tape does not extend any further from the tape reel.

In another embodiment, an apparatus for setting up a perimeter is provided. The apparatus includes a plurality of tape dispensers 10. The following exemplary embodiment is described using a 4-sided rectangle that is defined using a plurality of tape dispensers 10. But one skilled in the art will understand that any kind of geometric shape can be defined using an appropriate number of tape dispensers 10 to make the shape.

Figure 8:
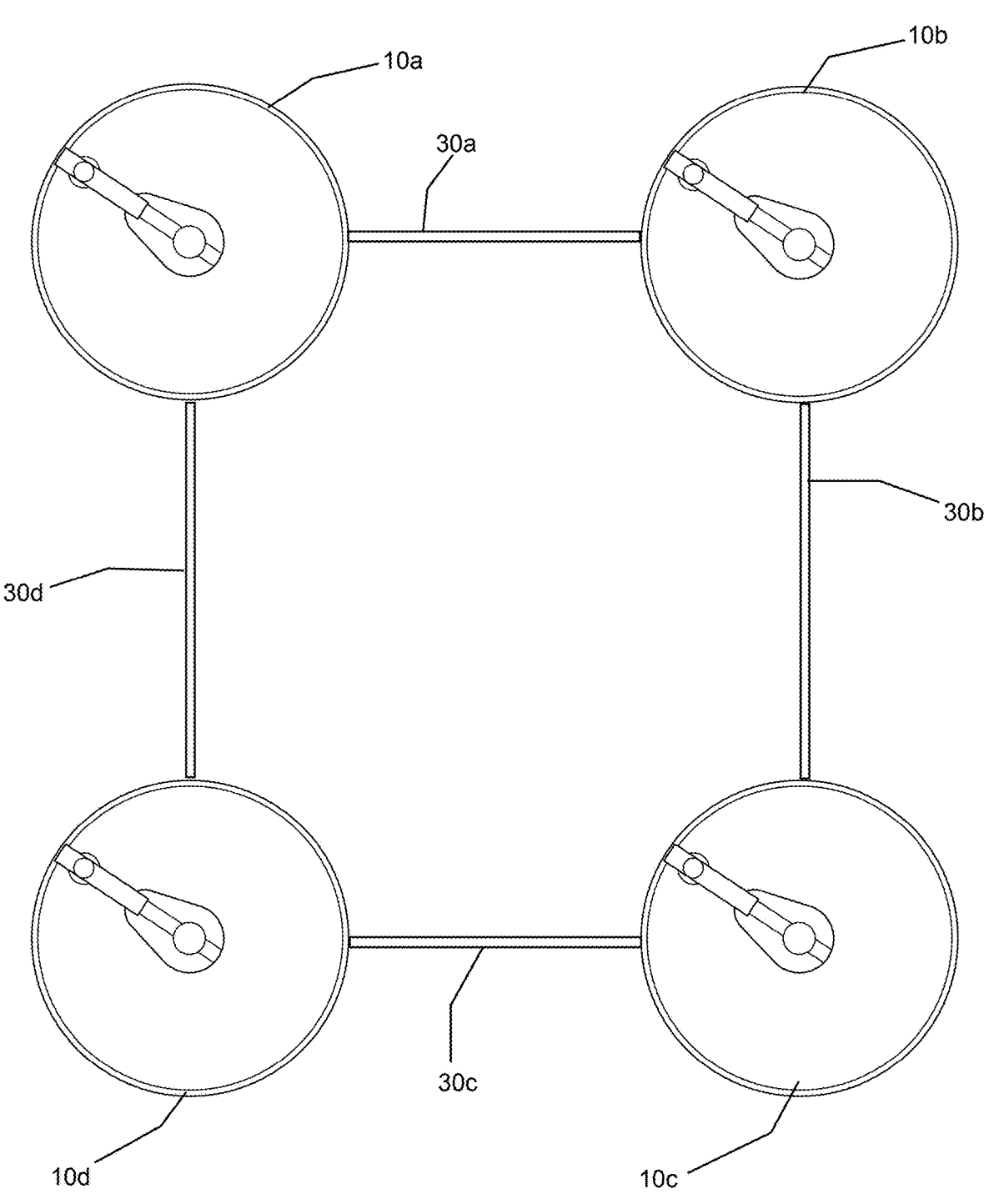
FIG. 8 is a perimeter set up using a plurality of spooled marking apparatuses as disclosed in accordance with at least one embodiment of the present invention.

FIG. 8 shows a perimeter defined by four different tape dispensers 10. First the four tape dispensers 10a, 10b, 10c, 10d are affixed on a suitable surface such as a turf to define the four corners of the rectangle. Then, the tape or marking device 30 is extended from the tape reel of one tape dispenser and fastened onto the fastener receptacle of the second tape dispenser. Alternately, the first tape dispenser 10a is affixed on a suitable surface, and then the tape is extended along a desired direction until the predetermined distance has been covered, at which point the second tape dispenser 10b is affixed. The fastener receptacle is configured to be 90 degrees from the extending tape that allows for making a rectangle shape. The tape from second tape dispenser is similarly extended and fastened to the third tape dispenser, and the third tape dispenser is fastened to the fourth tape dispenser. In the alternate embodiment described herein, the tape is extended from the second tape dispenser along the desired direction to the desired length at which point the third tape dispenser is affixed. Finally, the fourth tape dispenser is fastened to the first tape dispenser thus forming a rectangular perimeter.

For perimeters having other shapes and dimensions, the angle between the fastener receptacle and the tape is adjusted accordingly.

In some embodiments, the tape dispenser or marking apparatus 10 may be used to measure distances between any two given points at any given angle without any limitations and create any geometric shape as required. Further, any kind of marker such as a peg or stake can be used to mark positions with or without the tape in place. The extension of the tape to demarcate boundaries and perimeters is an option, and in many instances, just marking the edges of boundaries based on accurate measurement without the use of the tape is in itself a requirement.

Figure 9:
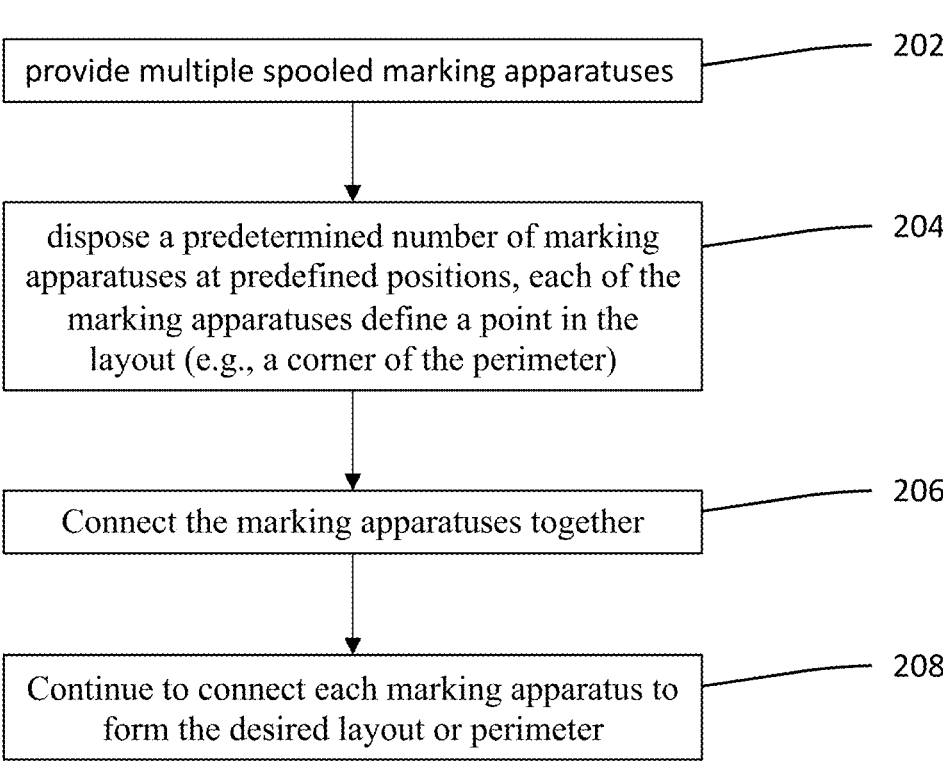
FIG. 9 is a flow chart representation of the method steps according to an embodiment.

In another embodiment, a method for setting up a perimeter is provided. FIG. 9 is a flowchart representation of the steps involved in the method, generally depicted by numeral 200. In step 202, the method includes providing a plurality of tape dispensers 10. Then the method involves affixing a predetermined number of tape dispensers at predefined positions that define corners of the perimeter, shown in step 204. Subsequently, the method includes the step of connecting two tape dispensers by extending the tape from the first tape dispenser and fastening it to the second tape dispenser to define one side as seen in step 206. Then, step 208 includes repeating the connecting of plurality of tape dispensers to each other to define all the sides of the perimeter.

The tape dispenser, the apparatus and the method of the embodiments enable simplicity in setting up of perimeter in a rapid and accurate manner by provide tape dispenser that can dispense tape having distance measurements, and a built-in means for fastening the extended tape. For example, the embodiments enable rapid and facilitate setting up of a standard volleyball court that has a standard playing court dimensions of 18 m long and 9 m wide, or a beach volleyball court whose dimensions are 16 m long and 8 m wide. Some playing arenas such as a football field are defined by yards, and the tape may be configured to also include measurements in those units. Another unique advantage offered by the tape dispenser of the embodiments is that the perimeter can be expanded or reduced based on requirement without too much effort. For example, a perimeter can be set up for a pick-up soccer game that involves 11 players in a side, which would require a larger laying area. However, if the number of players who actually show up are lesser, then the tape dispensers can be appropriately shifted to demarcate a smaller area, say for a 5-a-side soccer game instead. The tape dispensers of the embodiments enable this transformation within a matter of seconds by providing all the requisite tools within the tape dispensers. This puts greater emphasis on the activity per se such as the sports activity rather than making the setting up of the perimeter a time consuming and labor-intensive activity by itself.

Figure 10:
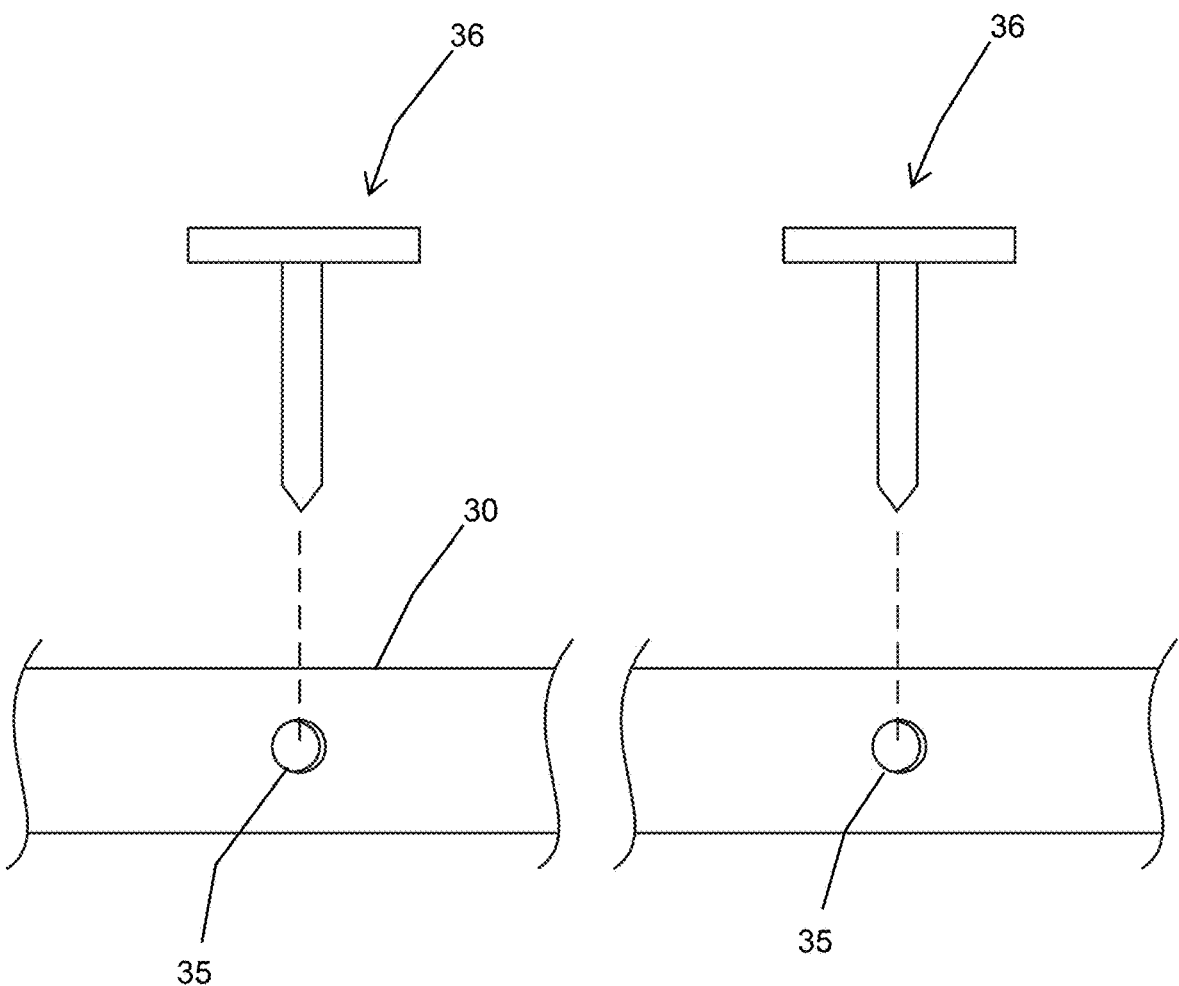
FIG. 10 is a cut-away view of the elongated marking device illustrating a plurality of holes disposed along the length thereof and a plurality of securing devices in exploded view being connected there through as disclosed in accordance with at least one embodiment of the present invention.
Figure 11:
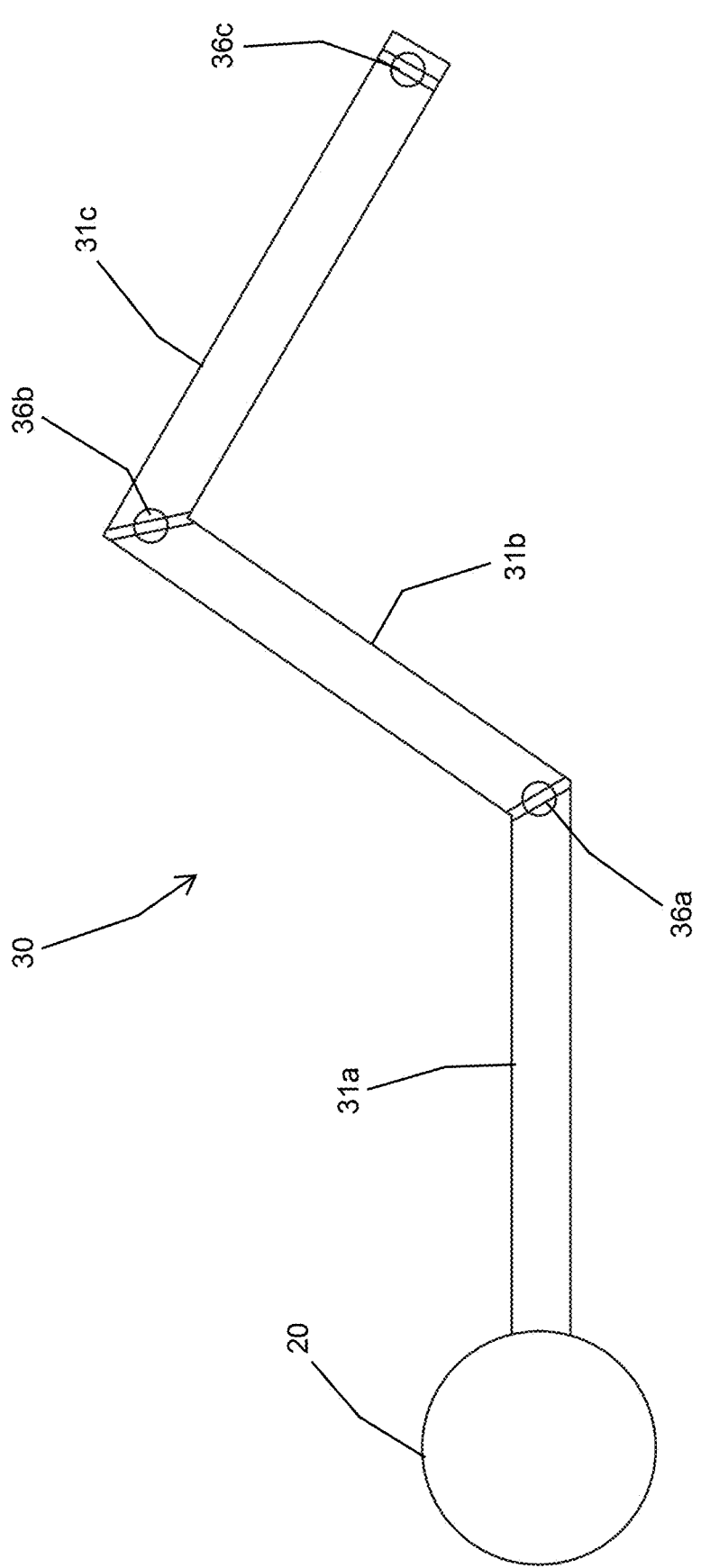
FIG. 11 is a schematic view of the spooled marking apparatus and elongated marking device thereof being disposed in several angled orientations via the positioning assembly of the holes and securing device illustrated in FIG. 10 as disclosed in accordance with at least one embodiment of the present invention.

With reference now to FIGS. 10 and 11, for example, in at least one embodiment, the elongated marking apparatus or tape 30 includes a plurality of holes or openings 35 disposed in a spaced relation along a length thereof, or along a portion of the length thereof. The holes or openings 35 may be disposed at certain equal or unequal intervals (e.g., every one foot, every three feet, etc.) In this manner, one or more stakes 36, pegs or other securing devices (e.g., pins, etc.) can be secured through one or more of the holes 35 in order to selectively secure the tape or marking apparatus 30 to the surface at that designated spot.

As just an example, the stake 36 may include an enlarged head and an elongated shaft, as generally shown in FIG. 10, such that the elongated shaft is disposable through a selected one of the holes 35 or openings while the head prevents the stake from passing all the way through the hole 35 or opening. Of course, other securing devices 36 are contemplated within the full spirit and scope of the present invention. In any event, the plurality of holes 35 and corresponding securing devices 36 allow the tape or elongated marking apparatus 30 to be selectively angularly disposed along the length thereof to mark angled lines with a single tape 30 or apparatus 10.

As just an example, in at least one embodiment, a single apparatus 10 can be used to set up or mark running routes for wide receivers and running backs in football. Of course, establishing running routes in football is just one example of a situation wherein the tape dispenser of the embodiments is used to measure distances accurately by affixing one end and marking the first and second spot with suitable markers such as a peg or a stake but doesn't require the tape to be extended between the two spots.

For example, with reference to FIG. 11, the tape or elongated marking apparatus 30 is shown extended from the reel 20 and secured at three different locations via stakes 36*a*, 36*b*, 36*c* defining three sections 31*a*, 31*b*, 31*c* of the tape or marking device 30. More specifically, stake 36*a* is disposed through a corresponding hole 35 in the tape 30 to secure the tape 30 to the ground or other surface at that location allowing sections 31*a* and 31*b* to be angularly disposed to one another. Similarly, stake 36*b* is disposed through another one or a different one of the holes 35 in the tape to secure the tape 30 to the ground or other surface at that location, thereby allowing the sections 31*b* and 31*c* to be angularly disposed relative to one another. In this manner, the stakes or other securing devices 36 each define, or substantially define, an angle vertex of the angle formed between the corresponding leading and trailing sections of the tape 30. As just an example, securing device 36*s* acts as or otherwise defines an angle vertex of the angled formed by leading section 31*b* and trailing section 31*a* of the tape 30.

Further, end zones in football can be accurately mapped out using the in-built tape measure that can provide exact measurement on any surface like grass and/or track.

That is, with the tape dispenser or marking apparatus 10 as described, connecting to other cones is unnecessary to create a measured perimeter. For example, on grass, one can use a single tape dispenser 10 to measure a distance in a straight line, then a grass stake or peg can hold the tape on the ground, the tape reel 14 can be pivoted continue into another direction to make a variety of shapes without the need to use cones as placeholders.

Figures 12A, 12B:
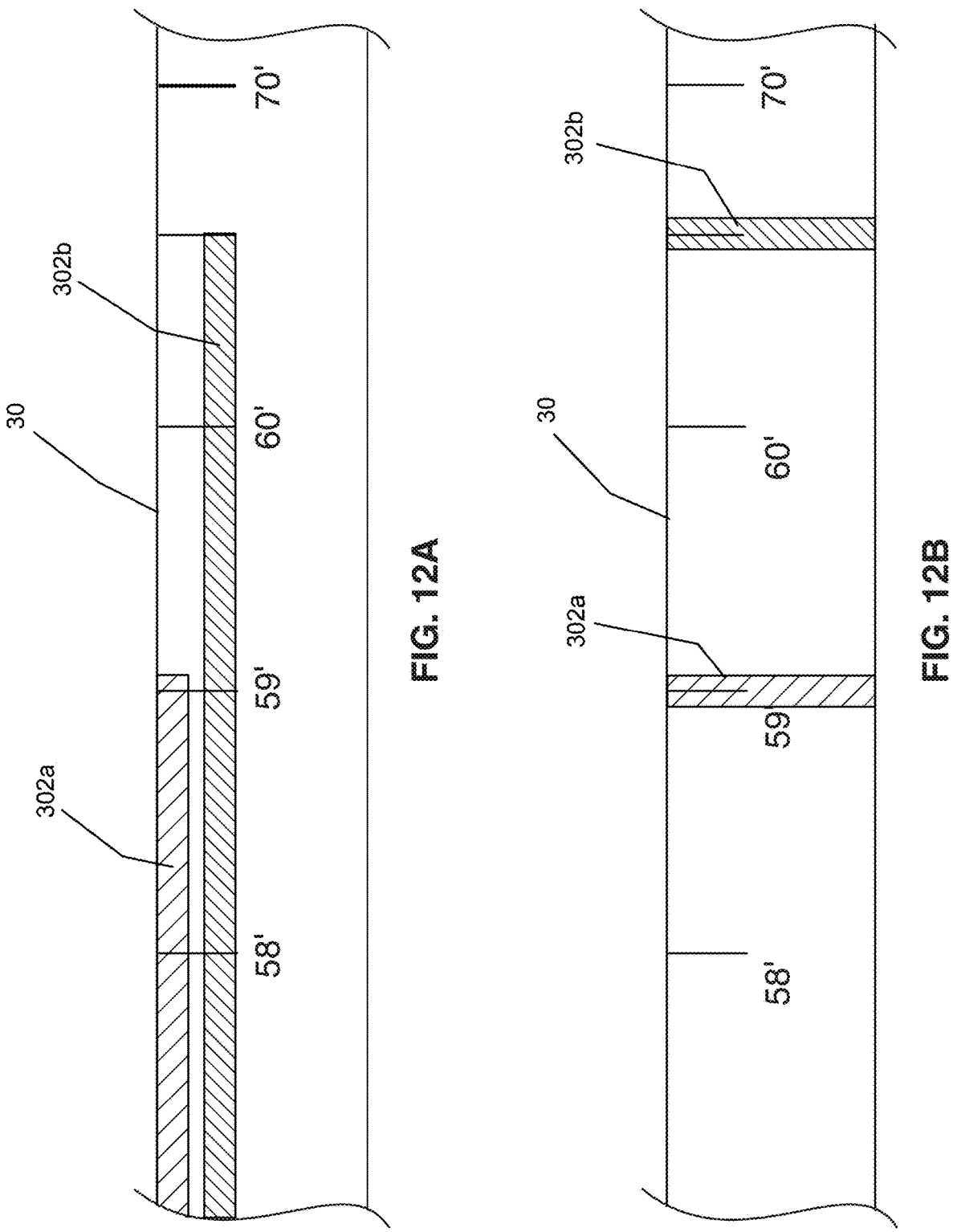
FIG. 12A is a cut-away view of the elongated marking device with a plurality of color-coded markings disposed thereon as disclosed in accordance with at least one embodiment of the present invention.
FIG. 12B is another cut-away view of the elongated marking device with a plurality of color-coded markings disposed therein as disclosed in accordance with at least one embodiment of the present invention.

With reference now to FIGS. 12A and 12B, yet another embodiment is illustrated. In this example, the tape or elongated marking apparatus 30 includes a plurality of color-coded markings 302*a*, 302*b* disposed along the length thereof in order for the user to easily identify certain desired lengths of markings on the tape 30. As an example, each of the different markings 302*a*, 302*b* may represent a different standardized or predetermined length. For example, the standardized length or predetermined length designated by the color-coded markings 302*a*, 302*b* may be used to represent a portion of a standardized athletic playing surface or playing field, including, but in no way limited to a section or portion of an American football field, baseball diamond, soccer field, basketball court, lacrosse field, etc.

As just an example, a user may desire to mark the distances between each base in the sport of baseball for collegiate play. Those distances are standardized (e.g., ninety feet) and can, in at least one embodiment of the present invention, be marked on the tape or marking apparatus 30 using at least one of the different color-coded markings 302*a*, 302*b*. Similarly, the distance between the pitcher's mound and home plate is standardized (e.g., sixty feet, six inches) and can be marked on the same tape 30 using a different one of the color-coded markings 302*a*, 302*b*. In this manner, a single apparatus 10 and/or marking device 30 thereof, can be color-coded to represent various standardized measurements for a sport, athletic field, event, etc.

In this manner, the plurality of color-coded markings may include a first color-coded marking 302*a* of a first color representing a first standardized length associated with a playing surface, athletic event, etc., and a second color-coded marking 302*b* of a second color representing a second standardized length associated with a second playing surface, athletic event, etc. While the color of the first color-coded marking 302*a* is different than the color of the second color-coded marking 302*b*, and while the standardized lengths are different, the first and second playing surface, athletic event, etc. may be different or the same. For instance, in the college baseball example above, both markings 302*a*, 302*b* are measurements for the same sporting event, college baseball, albeit different portions of the playing surface.

It should be noted that any number of color-coded markings (e.g., one, two, three or more) can be disposed on a single tape or marking device 30 in order to denote different measurements for the same or different events, playing surfaces, etc. Furthermore, the color-coded markings 302*a*, 302*b* can be disposed on the tape or marking device 30 in various ways. FIG. 12A shows several longitudinal color-coded markings that end a the designated standardized length, whereas FIG. 12B shows several lateral color-coded markings at the respective standardized lengths.

Other markings can be used in accordance with the various embodiments of the present invention, including lines, dots, or other shapes, or marks. The standardized markings may also be in forms other than colors, such as in the form of lines with different thicknesses, different weight or shading, different shaped markings, etc.

Furthermore, the color-coded marking system of at least one embodiment of the present invention can also benefit other industries other than athletic events, including, for example, the construction industry by providing standardized length indicators for various materials. For example, the markings 302*a*, 302*b* on the strip, band, or tape 30 could represent the standard length of a 2×4 piece of wood. Similarly, the system could denote the standardized spacing between support beams during structural construction, offering a clear and efficient way to measure and manage materials on-site.

Figure 13:
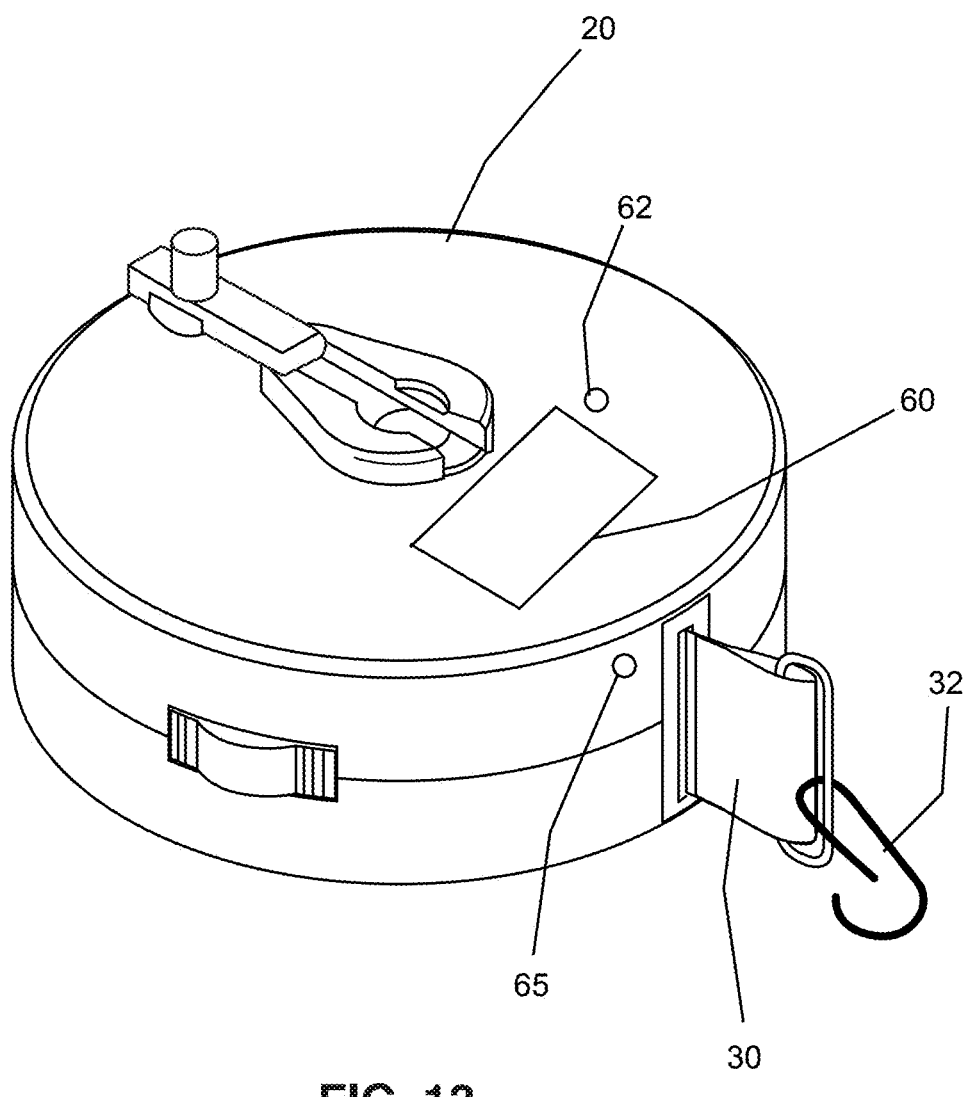
FIG. 13 is a perspective view of the reel illustrating a digital display, speaker and laser emitter as disclosed in accordance with at least one embodiment of the present invention.

With reference now to FIG. 13, in at least one embodiment, the reel 20 includes a digital or other display, general referenced as 60, and in some cases, one or more speakers, referenced as 62. Of course, the size, shape, orientation and location of the display 60 and speaker 62 are for illustrative, non-limiting purposes only in that other embodiments may include a different display or displays, in a different location, orientation, shape and size and still fall within the full spirt and scope of the present invention.

In particular, the display 60 may be used to display various information pertaining to the reel 20 and the tape or marking device 30 thereof, such as, but not limited to the distance at which the tape or marking device 30 is extended out of the reel. For example, a user may select (e.g., through an input on the display 60, an input on a different portion of the reel, or an input on an external device, as described herein) a desired length of which to extend the tape 30.

When that desired length or predefined length is reached, an alert (e.g., via a sound through the speaker and/or a notification on the display) may indicate to the user that the length has been reached.

In some cases, the apparatus 10 may include one or more sensors, processors, memory, storage device, etc. in order to facilitate implementation of the display 60, speaker 62, alerts, etc. For instance, at least one sensor may determine or detect the orientation from which the tape or marking device 30 is pulled or extracted from the reel 20. If, for example, the tape or marking device 30 is being pulled or extracted at an undesirable orientation (e.g., not straight out from the reel), then at least one of the sensors is configured to detect that orientation and alert the user, for example, via an audible alert through the speaker or visual alert on the display 60.

The display 60 of at least one embodiment may also be configured to display a compass or other orientation or angle to show what direction the tape or marking device 30 is being extracted to or retracted from.

In some cases or embodiments, the reel 20 and/or the processor and/or sensors thereof may detect a desired length or distance (e.g., via an input provided by the user on the reel 20, apparatus 10 or mobile device) and will automatically retract or extend the tape or marking device 30 to match that distance or length.

Furthermore, in some embodiments one or more lasers 65 or laser devices may be disposed within the housing 22 of the reel 20, base 40, or at another location of the apparatus 10 in order to map or mark the distance, orientation, angle or other parameters of the marking material 30.

Figure 14:
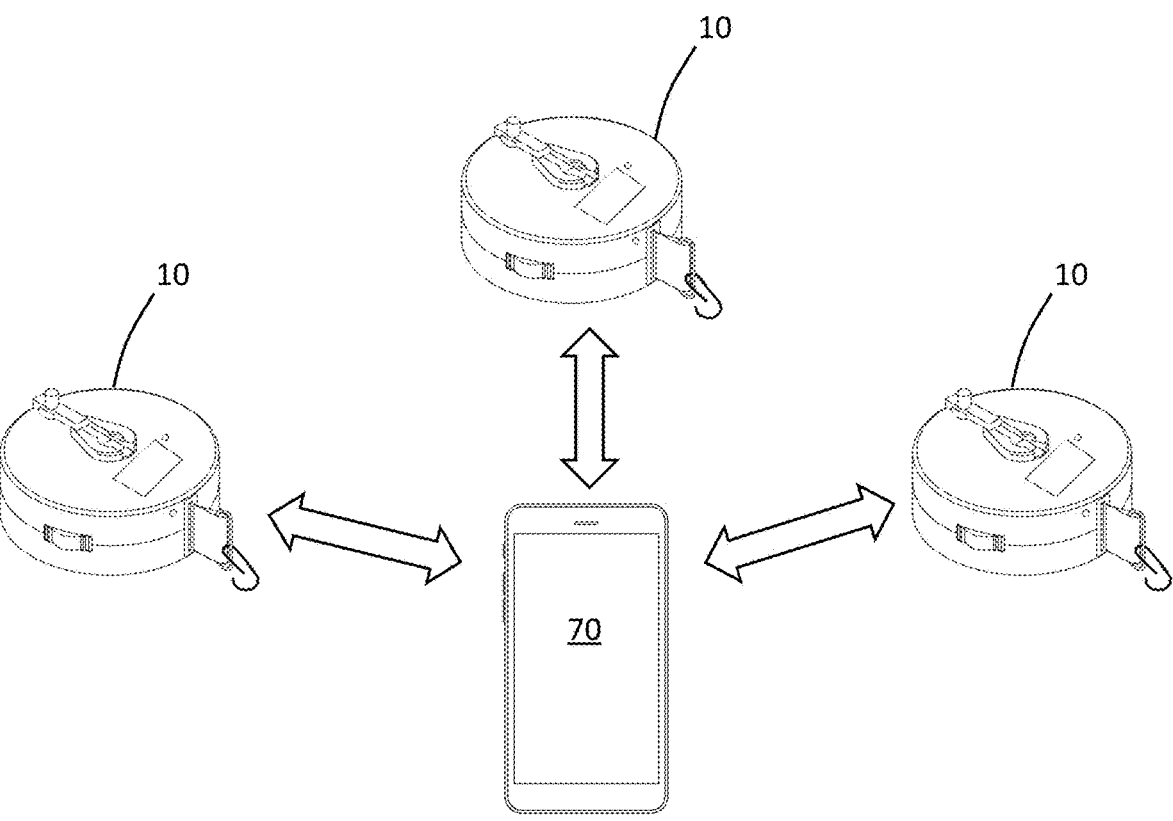
FIG. 14 is a schematic diagram illustrating a plurality of spooled marking apparatus wirelessly connected to a user device as disclosed in accordance with at least one embodiment of the present invention.
Figure 15:
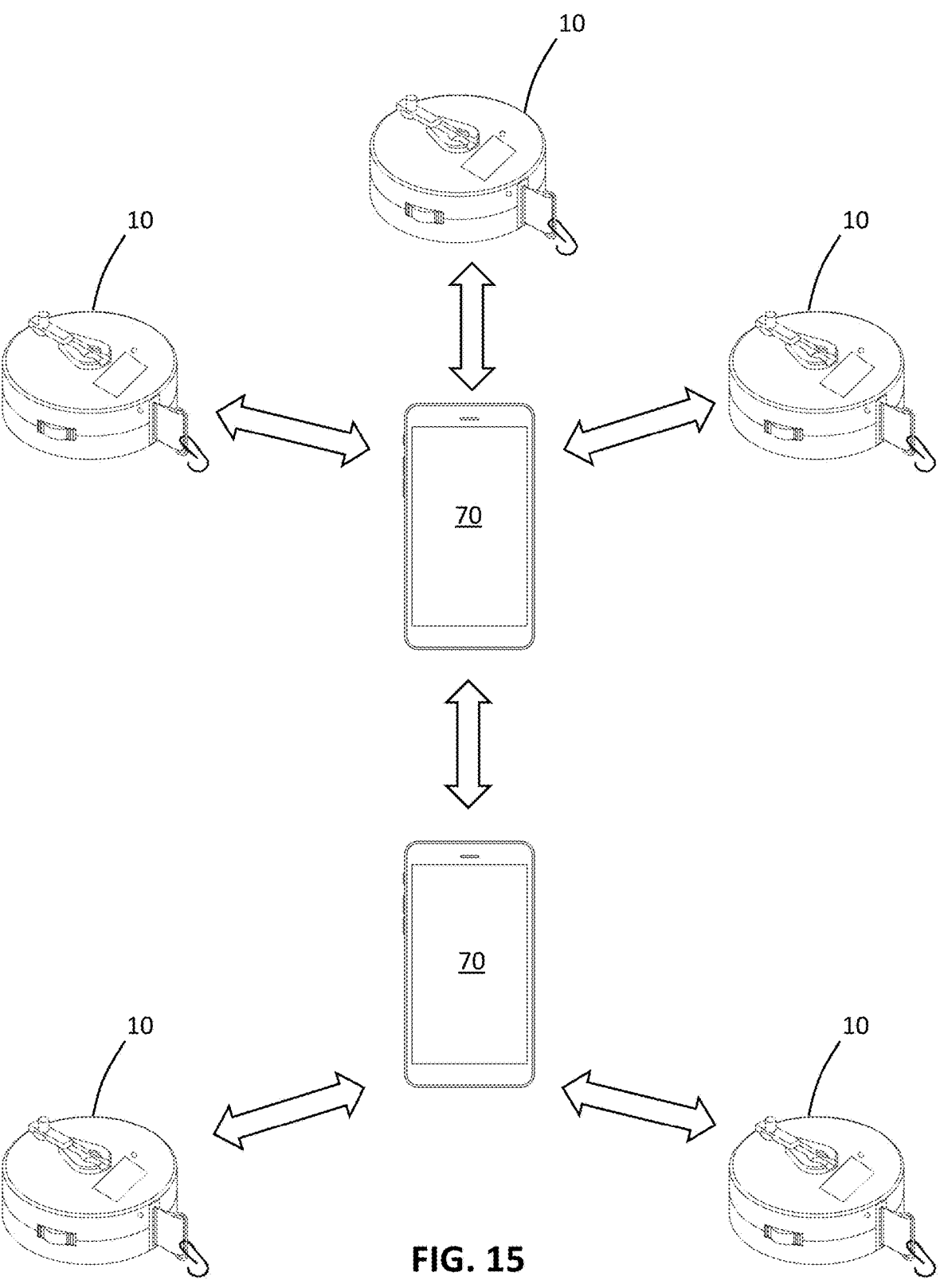
FIG. 15 is another schematic diagram illustrating a plurality of user devices communicatively connected to one another view a wireless network as disclosed in accordance with at least one embodiment of the present invention.

Referring now to FIGS. 14 and 15, yet another embodiment of the present invention includes the use of one or more mobile user devices 70, which may include any smartphone, tablet computer, laptop computer, wearable device such as a smartwatch, etc. The user device 70 is communicable with the marking apparatus 10 of at least one embodiment through a wireless connection or network which can include, but is in no way limited to Bluetooth, Zigbee, WiFi, Intranet, Internet, wide area network, local area network, metro area network, etc.

In this manner, the user device 70 may include an application installed thereon or otherwise accessible by the user device 70 which can be used to communicate with one or more marking apparatuses 10. The application or user device 70 can be used to define settings, distances, lengths, etc. for each of the one or more apparatus 10 in order to more efficiently build a perimeter, playing field, etc. For instance, global positioning systems, NFC devices, geolocation technology, or other location methods can be implemented in order for the mobile device 70 and/or the application accessible thereby to map locations for each of a plurality of marking apparatuses 10 to collectively build or mark the playing surface, perimeter, or other layout as desired. In some cases, each of the apparatuses 10 may include one or more location-based devices (e.g., GPS transmitter/receiver, NFC device, Bluetooth location device, etc.) to communicate with the user device 70 and facilitate an immersive mapping of the one or more apparatus 10 in the desired locations or layouts.

Referring to FIG. 15, several user devices 70 may also communicate with one another, for example, via the application described herein, in order to develop a social networking of several users, each of whom control one or more marking apparatuses 10. In this manner, several users may combine and communicate with one another via the user devices and/or applications to build or design a desired layout, perimeter, playing surface, etc., or to engage in a sporting activity.

While only certain features of the embodiments have been illustrated and described herein, many modifications and changes will occur to those skilled in the art. It is, therefore, to be understood that the appended claims are intended to cover all such modifications and changes as fall within the true spirit of the embodiments.

The invention claimed is:

1. A spooled marking apparatus comprising:
a reel,
a base,
said base comprising a top surface and a bottom surface, said bottom surface of said base comprising a concave curvature, wherein said base is disposable in a movement restricting relation with a supporting surface as a result of a weight of said reel distributed upon said top surface of said base,
said reel comprising a housing and a spool disposed within said housing, said spool comprising an elongated marking device wound thereon and extendable out of said housing,
a plurality of holes disposed in a spaced relation along a length of said elongated marking device, and
at least one securing device disposable through at least one of said plurality of holes and into an engaging relation with the supporting surface to removably secure said elongated marking device to the supporting surface.

2. The apparatus as recited in claim 1 wherein said at least one securing device comprises a stake with an enlarged head and an elongated shaft, said elongated shaft being disposable through said at least one of said plurality of holes and into the supporting surface.

3. The apparatus as recited in claim 2 further comprising a plurality of securing devices, each of said plurality of securing devices being disposable through a different one of said plurality of holes disposed along said length of said elongated marking device.

4. The apparatus as recited in claim 3 wherein, with at least one of said plurality of securing devices secured through said at least one said plurality of holes, said elongated marking device is positionable in an angular orientation with said at least one of said plurality of securing devices defining an angle vertex.

5. The apparatus as recited in claim 1 wherein said elongated marking device further comprises a plurality of color-coded markings disposed along said length of said elongated marking device, wherein each of said plurality of color-coded markings represents a different standardized length.

6. The apparatus as recited in claim 5 wherein said different standardized lengths each represent at least a portion of an athletic playing surface.

7. The apparatus as recited in claim 6 wherein said plurality of color-coded markings comprises a first color-coded marking representing a first standardized length associated with a first playing surface, and a second color-coded marking representing a second standardized length associated with a second playing surface, wherein the first color-coded marking and the second color-coded marking are different colors.

8. The apparatus as recited in claim 1 wherein said reel is not removable from said base.

9. The apparatus as recited in claim 1 wherein said reel is removably connected to said base via a connector, said reel being rotatable relative to said base.

10. The apparatus as recited in claim 1 further comprising a fastener disposed at a distal end of the elongated marking device.

11. The apparatus as recited in claim 10 wherein said fastener is selectively attachable to another spooled marking apparatus.

12. A spooled marking apparatus comprising:

a reel, a base, said base comprising a top surface and a bottom surface, said bottom surface of said base comprising a concave curvature, wherein said base creates a suction effect upon a supporting surface as a result of a weight of said reel being distributed upon said top surface of said base, said reel comprising a housing and a spool disposed within said housing, said spool comprising an elongated marking device wound thereon and extendable out of said housing, wherein said elongated marking device comprises a plurality of color-coded markings disposed along thereof, and wherein each of said plurality of color-coded markings represents a different standardized length.

13. The apparatus as recited in claim 12 wherein said different standardized lengths each represent at least a portion of an athletic playing surface.

14. The apparatus as recited in claim 13 wherein said plurality of color-coded markings comprises a first color-coded marking representing a first standardized length associated with a first playing surface, and a second color-coded marking representing a second standardized length associated with a second playing surface, wherein the first color-coded marking and the second color-coded marking are different colors.

15. The apparatus as recited in claim 12 wherein said reel is not removable from said base.

16. A spooled marking apparatus comprising:

a reel and a base, said reel and said base comprising a single unit, wherein said base comprises a top surface and a bottom surface, said bottom surface of said base comprising a concave curvature, wherein said base is disposable in a movement restricting relation with a supporting surface as a result of a weight of said reel distributed upon said top surface of said base, said reel comprising a housing and a spool disposed within said housing, said spool comprising an elongated marking device wound thereon and extendable out of said housing.

17. The apparatus as recited in claim 16 further comprising:

a plurality of holes disposed in a spaced relation along a length of said elongated marking device, and at least one securing device disposable through at least one of said plurality of holes and into an engaging relation with a supporting surface to removably secure said elongated marking device to the supporting surface.

18. The apparatus as recited in claim 17 wherein said elongated marking device comprises a plurality of color-coded markings disposed along thereof, and wherein each of said plurality of color-coded markings represents a different standardized length.

\* \* \* \* \*